H. P. TAYLOR.
LOCKING MEANS FOR AUTOMOBILES.
APPLICATION FILED MAR. 31, 1919.
1,369,308.
Patented Feb. 22, 1921.
3 SHEETS—SHEET 3.
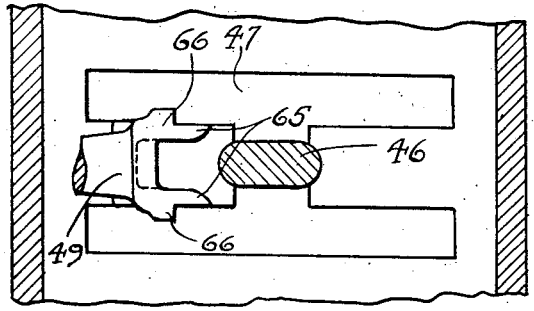
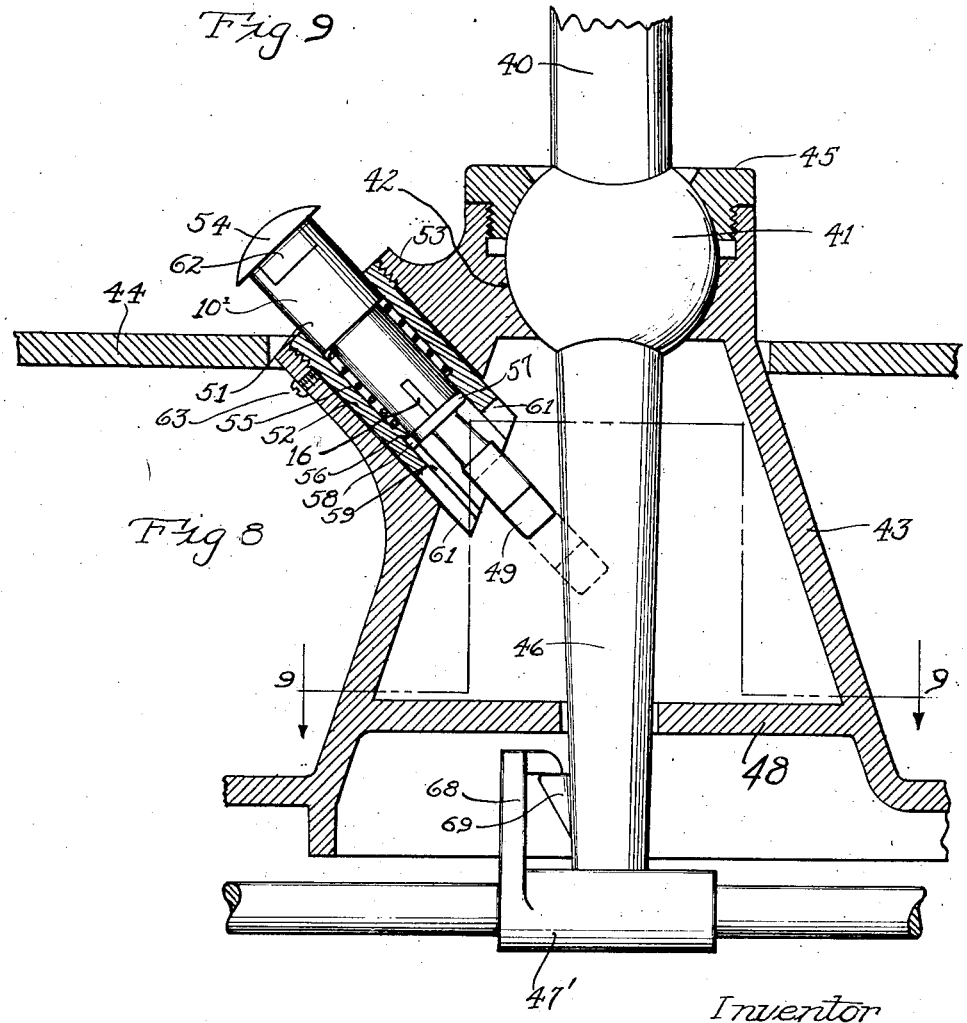
Inventor
Harry P. Taylor
By— Brown, Boettcher & Dienner
Attorneys

UNITED STATES PATENT OFFICE.

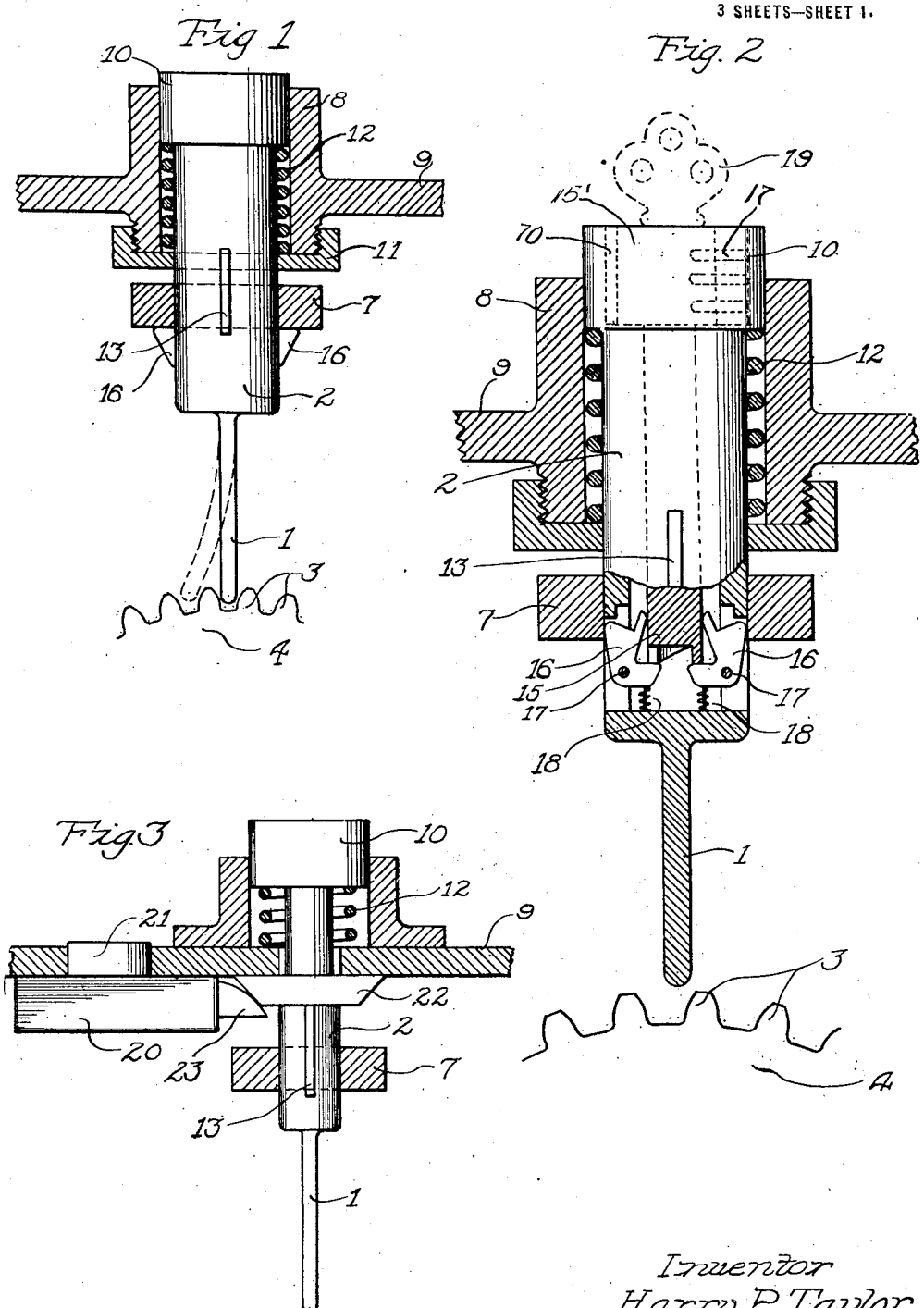

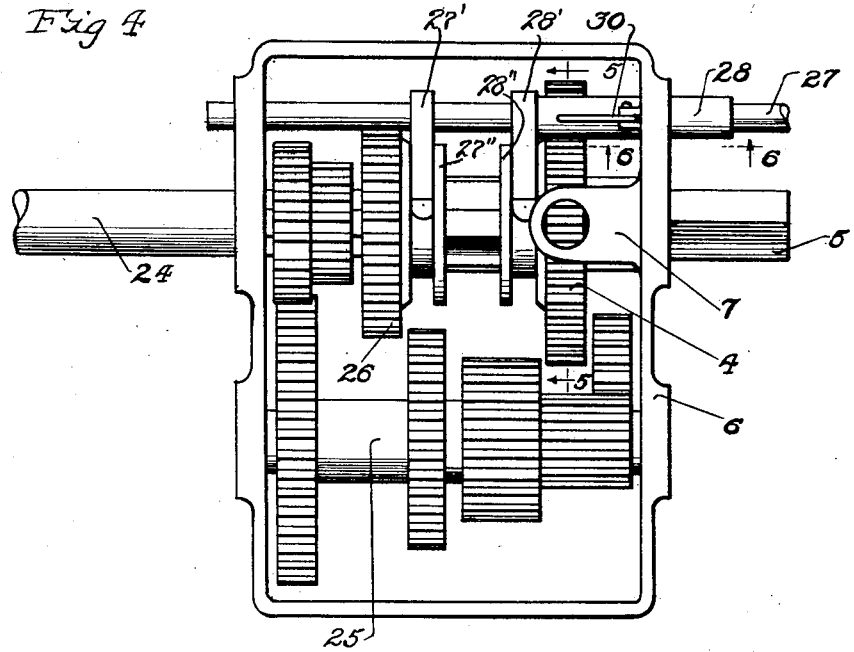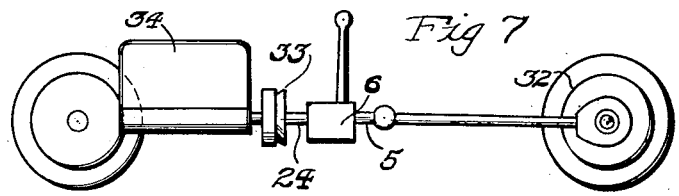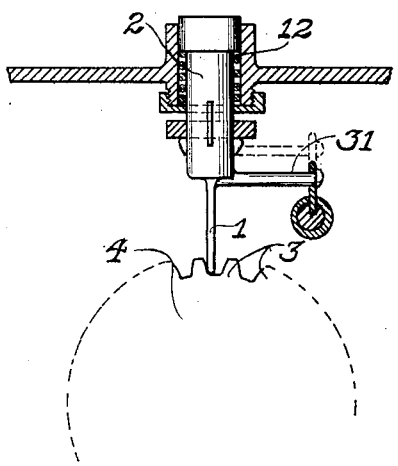

HARRY P. TAYLOR, OF LOS ANGELES, CALIFORNIA, ASSIGNOR TO STROMBERG MOTOR DEVICES COMPANY, OF CHICAGO, ILLINOIS, A CORPORATION OF ILLINOIS.

LOCKING MEANS FOR AUTOMOBILES.

1,369,308.  Specification of Letters Patent.  Patented Feb. 22, 1921.

Original application filed June 14, 1917, Serial No. 174,727. Divided in part and this application filed March 31, 1919. Serial No. 286,394.

*To all whom it may concern:*

Be it known that I, HARRY P. TAYLOR, a citizen of the United States, residing at Los Angeles, in the county of Los Angeles and State of California, have invented a certain new and useful Improvement in Locking Means for Automobiles, of which the following is a full, clear, concise, and exact description, reference being had to the accompanying drawings, forming a part of this specification.

The present invention relates to locking means for automobiles and is divisional of certain subject matter of my co-pending application, Serial Number 174,727, filed June 14, 1917, directed to an improvement in theft preventing alarm and locking means for automobiles, the subject matter referred to being locking mechanism only.
In the above mentioned application I have disclosed a combined lock and alarm mechanism operating upon the transmission or change speed mechanism of an automobile.

The present application is concerned solely with the locking and interlocking features of this mechanism, the claims of the parent application being directed to the alarm feature.

I have stated above that in its contemplated form the locking mechanism is arranged to lock the transmission in neutral, but I wish it understood that it is also within the scope of my invention to lock a car in gear or immovably where this is desired.

In the appended drawings, in which I have illustrated one particular embodiment of my invention, Figure 1 is a fragmentary sectional view of a gear box and gear showing the alarm mechanism in place;

Fig. 2 is an enlarged sectional view of the same showing the alarm in unlocked position;
Fig. 3 is a modified form in which the lock is placed outside of the plunger;

Fig. 4 shows a typical gear box with gear shifting means adapted to receive the lock mechanism of my invention;
Fig. 5 is a section showing the lock engaging the gear shift rod;

Fig. 6 is a section taken on the line 6—6 of Fig. 4 showing the means for locking the gear shifting mechanism and for simul-
taneously setting the alarm in operative position;

Fig. 7 is a diagrammatic sectional view of an automobile showing the manner of employing my invention;

Fig. 8 is a sectional view of a modified arrangement of my locking mechanism as applied to a gear shift lever; and Fig. 9 is a sectional view taken substantially on the line 9—9 of Fig. 8.

A practical locking or alarm device for preventing theft of an automobile must leave the vehicle free to be pushed about in case of fire. Any locking or alarm means which locks the running mechanism of the automobile violates ordinances in most cities, and hence is not generally useful. Any such mechanism which has its parts easily accessible is useless because automobile thieves are experts in rendering inoperative such a lock or alarm. Any device which causes the driver inconvenience or annoyance is impracticable. The present form of lock mechanism is so placed as to render it impossible to tamper with the same and is so arranged that it positively locks the transmission in neutral or by slight modifications locks the transmission in any other position.

The alarm is mounted in a gear case 6, having a propeller shaft 5 therein and extending therefrom, said shaft being connected to the driving wheels of the automobile. With particular reference to Fig. 7, the gear casing 6 is disposed between the drive shaft 24 and the driving wheel 32, the drive shaft 24 being connected through the gearing in the casing and the shaft 5 to the driving wheel 32, and by means of the clutch 33 said shaft 24 is connected to the engine 34.

The plunger 2, which carries the reed 1, described and claimed in my copending application hereinbefore referred to, passes through a lug 8 on the top of the transmission housing cover 9, this lug being bored out to guide the upper enlarged portion 10 of the plunger 2. The reed 1 carried by the plunger 2 may be made to engage the teeth 3 of the gear 4 in the casing. This forms no part of my present invention, however, and has been shown merely to illustrate a manner of producing an alarm by means of the plunger. The main body of the transmission or gear box 6 is provided with a laterally extending lug 7 which is bored out to guide the lower end of the plunger 2. The lug 8 extends inwardly from the cover 9 and is provided with a cap 11 bored out to receive the lower end of the plunger 2 and to confine the coil spring 12 between the upper enlarged portion 10 and the cap 11. The plunger 2 is prevented from turning by means of a key 13 which is secured thereto. This key engages a keyway (not shown) lying in the bore of the lug 7.

The upper end of the plunger 2 is provided with a pin tumbler lock or any other desired type, which extends down inside of the plunger 2 and has a cam shaft 15 bearing cams at the lower end thereof for engaging the locking pawls 16. The rotatable shaft 15 has at its upper end the barrel 15′ which contains a key slot for bearing the key 19 concentrically of the plunger 2. This locking cylinder 15′ is surrounded by a cylinder 70 which contains the pin tumblers or locking pins 71, shown in dotted lines in Fig. 2. The locking pawls 16 are formed in the shape of bell crank levers pivoted at 17 in the plunger 2, their inner arms being engaged by the cam in the lower end of the shaft 15 and their outer arms being adapted to move out laterally through the slot in which they are mounted when the plunger is pushed downward to engage the lower side of the lug 7, thereby locking the plunger in its lower position and holding the reed or tongue 1 in operative engagement with the teeth of the gear 4. Springs 18 engage the inner arms of the locking pawls 16 tending to throw them out of the slots in which they are mounted.

Considering the locking mechanism for the transmission gearing, as shown in Figs. 4, 5 and 6, it will be noted that the engine or driving shaft 24 is adapted to be connected directly to the propeller shaft 5 through the usual internal gear cut in the shiftable gear 26, or to be connected by means of the various change gears through the counter shaft 25 to the propeller shaft 5. The shiftable gears 4 and 26 are adapted to be shifted by means of the control shaft 27 and the surrounding sleeve 28, which bear the shifting forks 27′ and 28′ respectively engaging suitable shiftable collars 27″ and 28″ on the gears 26 and 4 respectively. I provide the shaft and sleeve with registering notches in which the lower end 29 of the hook 30 is adapted to drop for locking these parts against movement when the gears are in the neutral position. The notches in the rod 27 and in the sleeve 28 form interlocking shoulders which serve to lock the shifting forks against movement in neutral and also serve to prevent locking of the forks unless the transmission actually is in neutral. The hook 30 is pivoted at any convenient point, preferably to the wall of the gear box or housing 6 as is shown in Figs. 4 and 6. A rigid arm 31 extends laterally from the bottom of the plunger 2 and has pivotal attachment with the hook 30. This pivotal connection between the arm 31 and the hook 30 has a loose fit to permit freedom of movement since the arm 31 swings about its pivot. As a result, the locking plunger 2 and reed 1 cannot be depressed unless the transmission gears are in neutral position with the notches in the shifting shaft and sleeve registering, this inability to depress the plunger serving to apprise the operator that his gears are still engaged. Conversely, when the transmission gears are in neutral, depression of the plunger 2 locks the gear shifting mechanism so that it is impossible to operate the car under its own power.

It will be obvious that the plunger 2 is held down in its locking position by the locking pawls 16 swinging out of the barrel of the plunger and engaging the under surface of the lug 7, as shown in Fig. 1. When the owner of the car or his authorized agent wishes to disconnect the lock, the proper key which is shown in dotted lines at 19 in Fig. 2, is inserted in the barrel of the lock which lies in a bore in the end of the plunger, as shown in dotted lines in Fig. 2, and the shaft 15 is turned until the cams on the lower ends thereof bring the locking pawls 16 within the slots in which they are mounted, whereupon the spring 12 moves the plunger upward, releasing the hook 29 from the registering notches in the shaft 27 and sleeve 28.

In Fig. 3 I have indicated a modification in which an ordinary lock 20 is fastened on the lower side of the cover 9 having its barrel 21 extending up through the cover for the insertion of the key. In this case the plunger 2 is provided with a tapered collar 22 which is adapted to engage with the bolt 23 of the lock 20 when the plunger is pushed down so that the hook 29 locks the gear shifting mechanism in neutral position.

It is apparent from Figs. 1 and 2 that removal of the cover is ineffective as the locking pawls 16 engage a part which is fastened to the gear box itself, and thus the cover is locked upon the gear box. In the form shown in Fig. 3 the lock 20 is placed upon the bottom of the gear box lid and hence the lock does not secure the cover or lid 9 upon the box. It is obvious, however, that it would be within the skill of the ordinary mechanic to combine the lock of the form of my invention shown in Figs. 2 and 3 on the plunger so as to lock the cover in place.

In Fig. 8 I have illustrated an adaptation of my invention to a ball and socket gear shift mechanism. The shifting lever 40 is formed with a ball portion 41 which is fulcrumed for universal motion in a socket 42, formed in the top of a housing 43 which extends upwardly from the main gear box or housing through the floor board 44 of the driver's compartment. The ball socket 42 is completed by a retaining nut 45, which is screw threaded into the socket 42 and has a spheroidcal bearing surface engaging with the ball 41. The lower extension 46 of the shifting lever is confined in the customary H-shaped slot 47 which is cut in the transverse web 48 of the housing, as clearly shown in Fig. 9. The lower end of the shifting lever is arranged to have operative connection in suitable pockets formed in a pair of spaced shifting locks 47' which are rigidly mounted upon two parallel shifting shafts 48. The structural details of these shifting blocks and the mode of alternately engaging first one shifting block and then the other in making gear changes is entirely within the knowledge of any skilled auto mechanic and I shall therefore not burden the specification with a description of the same. Suffice it to say that by proper movement of the shifting lever 40 into the various positions of the H-slot 47, the shifting shafts 48 are actuated selectively and these, through the shifting forks mounted thereon, effect the shifting of the change speed gears. The arrangement is such that when the shifting lever is in the transverse slot of the H formation, the gears are in neutral and while in such position the shifting lever is adapted to be engaged by a locking fork 49 carried on the end of a depressible plunger lock 51.

The plunger lock 51 is guided in a sleeve 52 which is screw threaded into a boss 53 projecting up obliquely from the housing 43 through the floor boards 44. The general construction of the locking plunger 51 is similar to that illustrated in the preceding figures, with the exception of the provision of an end cap 54. The plunger is normally held in its extended position by the coiled spring 55, which is confined between the enlarged portion 10' and an inwardly extending shoulder 56 in the bore of the sleeve 52. The locking fork 49 is secured to the end of the plunger 51 by a collar 57, which is preferably attached to the plunger by small screws or the like. The collar 57 has a projecting lug or key 58 formed thereon, which is adapted to slide in a keyway 59 cut in the bore of the sleeve 52. This keyway is only cut to a point adjacent the shoulder 56 so that the key 58 will prevent the plunger lock from being withdrawn from the sleeve 52. The lower end of the sleeve 52 is faced off obliquely to permit maximum movement of the shifting lever 40. Accordingly, this end of the sleeve 52 is provided with two longitudinal slots 61 for forming square shoulders against which the locking pawls 16' can engage when the plunger is depressed.

By mounting the plunger lock 51 in the sleeve 52 and threading the latter into the boss 53, I am enabled to insert the assembled unit into operative position from the exterior of the casing, which is of particular advantage owing to the inaccessibility of the interior of the housing portion 43. The locking action of the fork 49 embracing the shifting lever 40 will obviously prevent the locking plunger and sleeve from being unscrewed from the housing. To facilitate threading of the locking unit into the boss 53 the enlarged portion 10' may be provided with milled surfaces 62 to afford convenient engagement for a tool, and to hold this locking unit against rotation in the boss 53 a set screw 63 is provided.

As shown in Fig. 9, the ends of the prongs 65 of the locking portion 49 are rounded at their inner corners to center the shifting lever 46 in the middle of the transverse slot of the H formation. It will be noted that I have also provided shoulders 66 extending laterally from each side of the shifting fork and projecting above the longitudinal slots of the H formation. These shoulders 66 have the function of blocking the descent of the plunger lock 51 if the shifting lever happens to be back in the longitudinal slots of the H formation, and thus apprise the driver that his transmission is not in neutral.

The interlock for preventing removal of the housing cover when the transmission mechanism is locked, is obtained by interlocking the lower end of the shifting lever 40 to the shifting blocks 47' which are connected to the lower portion of the transmission housing through the intervention of the shifting shafts 48 which have bearings in this part of the housing. One of the shifting blocks 47 is provided with a hook 68, formed integrally therewith and extending transversely of the shifting blocks. Arranged to coöperate with this hook is a lug 69 projecting from the rear of the gear shifting lever and adapted to engage under the hook 68 when the shifting lever is in neutral position. It will be apparent that by thus locking the gear shift lever to the shifting block, access cannot be had to the interior of the housing portion 43 through the removal of the shifting lever 40, nor can the cover of the transmission housing be removed for affording access to the change speed gears.

It is important that the means which blocks the operation of gear shifting be contained within the casing, first to protect it from dirt, dust, etc., and second, to prevent unauthorized access to it at all times. In the same manner the locking means which prevents withdrawal of the blocking means should be inclosed by the gear casing for the same reasons. In the device which I have invented it is necessary to go completely through a wall of the inclosing gear case before access can be had to either the blocking means or the locking means therefor. If any attempt is made to reach either the blocking means or the locking means the wall of the casing must be completely broken through. In doing so a broken piece or chips from the casing will be dropped into the gears because of the inclosed and compact construction. This renders the mechanism inoperative and therefore becomes a very effective lock. The gear case is filled with heavy oil which is constantly churned up by the gears and even the smallest chip will soon be drawn into the gears and will block the operation of the transmission.

Although I have illustrated and described my invention as adapted to certain forms of a particular type of transmission, modifications are contemplated within the scope of my invention as to the form of embodiment and as to uses with other transmission systems than that herein shown and described.

I claim:

1. In combination, a driving shaft, a propeller shaft, direction and ratio changing mechanism having a neutral position between said shafts, a closed box inclosing said mechanism, a plunger projecting into said box, said plunger being limited to axial movement and having a part normally projecting from the surface of the box, said part having a longitudinal concentric bore, automatic locking means for retaining the plunger in locking position and means disposed wholly within the box and controllable by the plunger for locking the mechanism in neutral position, said plunger being adapted to be pressed inwardly and locked with its outer end substantially flush with the surface of the box for locking said mechanism and a key engageable and rotatable lock releasing member permanently mounted in said bore.

2. In combination, a ratio and direction changing mechanism for automobiles, a casing in which said mechanism is inclosed, an axially slidable rod mounted within the casing, said rod having a notch lying within the casing and adapted to be in register with the engaging member when the mechanism is in neutral position and manually controlled locking means comprising a plunger extending through the casing, an engaging member disposed within the casing and operated by said plunger for engaging said notch within the casing to prevent motion of the rod out of neutral position, and a lock coöperating with the plunger to prevent releasing movement of said plunger.

3. In combination, a ratio and direction changing mechanism for automobiles, a casing in which said mechanism is inclosed, a rod forming a guide within the casing, a guided member bearing a shifting fork and being slidable on said rod, said member having an interlocking shoulder adapted to register with a blocking member when the mechanism is in neutral position, a blocking member, a spring opposed slidable plunger extending through the casing and having means for operating the blocking member to prevent motion of said member bearing the shifting fork, and automatic locking means coöperating with the slidable plunger to prevent releasing movement of said plunger.

4. In combination, a power transmission mechanism, a housing inclosing the same, a cover for said housing, locking means inclosed by said housing, said locking means having a plunger projecting from said housing, said plunger being adapted to lock the cover to the housing, means to lock the transmission mechanism, depression of said plunger automatically setting said locking means and moving said means to lock said transmission mechanism.

5. In combination, a power transmission mechanism, a housing inclosing the same, said housing including a cover and an abutment, a depressible plunger projecting from said housing, means adapted to be actuated by said plunger for locking said transmission mechanism, locking means associated with said plunger and disposed within the casing and spaced from the walls of the casing and coöperating with said abutment for locking said cover and said transmission mechanism automatically upon depression of said plunger.

6. The combination with a variable speed power transmitting mechanism, a casing inclosing the same and means for operating said variable speed transmitting mechanism, of means for locking said mechanism within the inclosing casing against operation, said locking means comprising a plunger projecting from said casing, said plunger being movable to locking position when the transmission is in neutral and key-releasable automatic locking means carried by said plunger, said locking means being carried with the plunger into the casing where the locking means is protected both by the plunger and by the casing when the plunger is moved to locking position.

7. The combination with a variable speed power transmitting mechanism, a casing inclosing the same, said casing including a removable cover and means having a portion disposed within the casing for operating said variable speed transmitting mechanism, of locking means for locking said operating means against operation and means coöperating with said locking means for locking said cover against removal from said casing, said locking means having a plunger projecting from said casing and key-releasable automatic locking means carried by said plunger.

8. In a lock for automobile transmissions and the like the combination with a closed transmission casing having a bore, said casing providing a shoulder at right angles to the plunger of a spring opposed locking plunger lying in said bore, said plunger having a longitudinal bore and bearing an automatic pivoted locking pawl adapted to engage said shoulder to hold the plunger in depressed position and a key engageable rotatable lock barrel having a lock cylinder carried in said longitudinal bore of the plunger and having means for releasing said locking pawl whereby the sliding wear and the strain on the pawl is carried by the plunger.

9. In combination a housing comprising a casing member and a cover member said members having alined bores, a slidable plunger permanently mounted in the bore of one of said members and having its outer end exposed, said plunger being adapted to be projected into the bore of the said other member and a locking device disposed within the plunger and adapted to automatically engage said latter member when the plunger is projected longitudinally inwardly into said latter bore to lock said members together, a releasing means limited to rotary motion adapted to release the locking device and a spring disposed in one of said bores for withdrawing the plunger automatically when the locking device is released.

10. In combination, a ratio and direction changing mechanism for automobiles, a casing in which said mechanism is inclosed, an axially slidable rod mounted within the casing, said rod having an interlocking shoulder lying within the casing, means adapted to engage said interlocking shoulder when the mechanism is in neutral position, comprising a plunger extending through the casing and having its inner end disposed within the casing for actuating said means to prevent motion of the rod out of neutral position, and a lock coöperating with the plunger to prevent releasing movement of said plunger.

In witness whereof, I hereunto subscribe my name this 19th day of March, A. D. 1919.

HARRY P. TAYLOR.